Nov. 29, 1949     F. W. SCHWINN     2,489,934
CYCLE FREEWHEELING DEVICE
Filed July 10, 1946     2 Sheets-Sheet 1
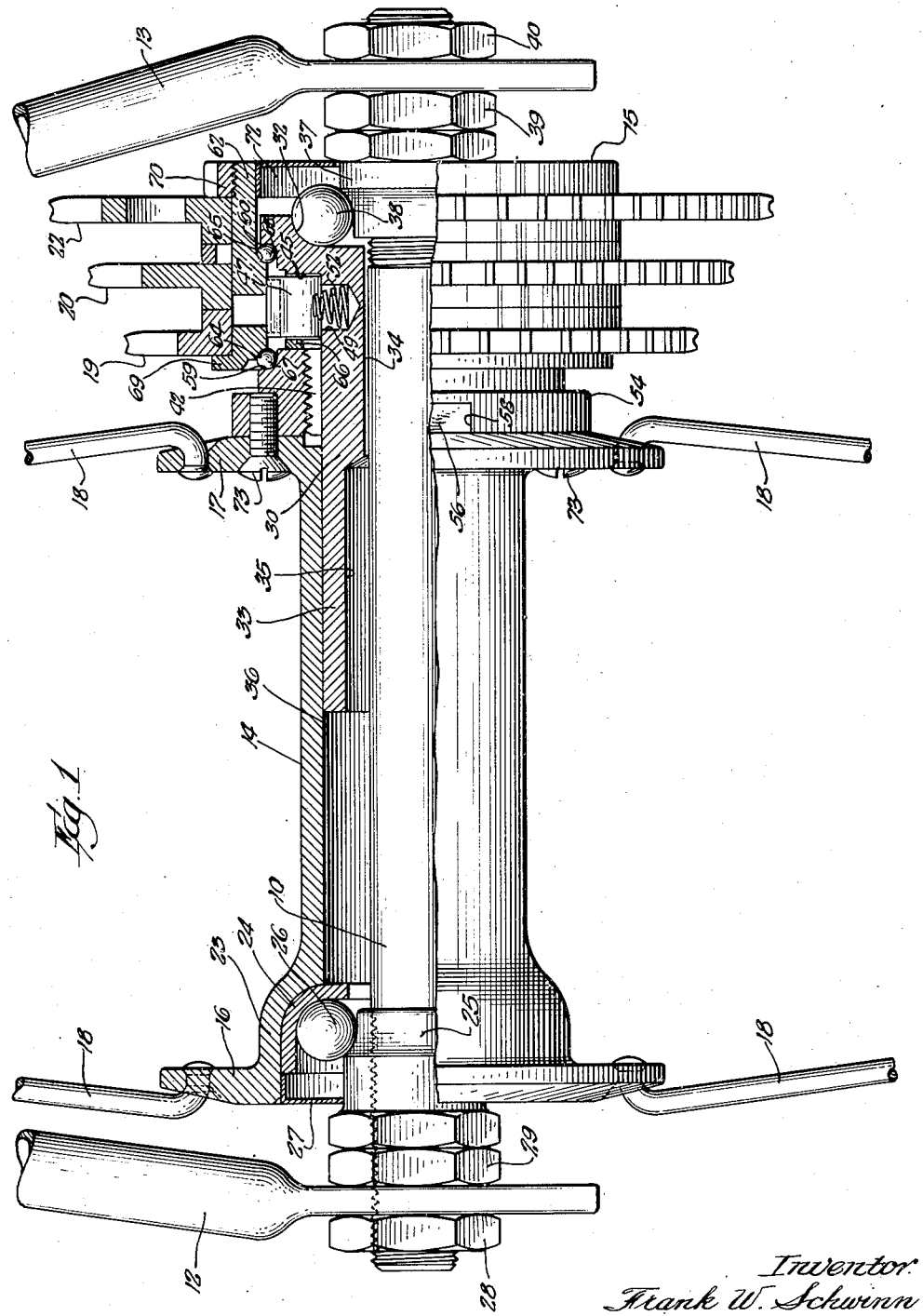
Inventor
Frank W. Schwinn
By: Albert G. McCaleb
Atty Nov. 29, 1949  F. W. SCHWINN  2,489,934
CYCLE FREEWHEELING DEVICE
Filed July 10, 1946   2 Sheets-Sheet 2
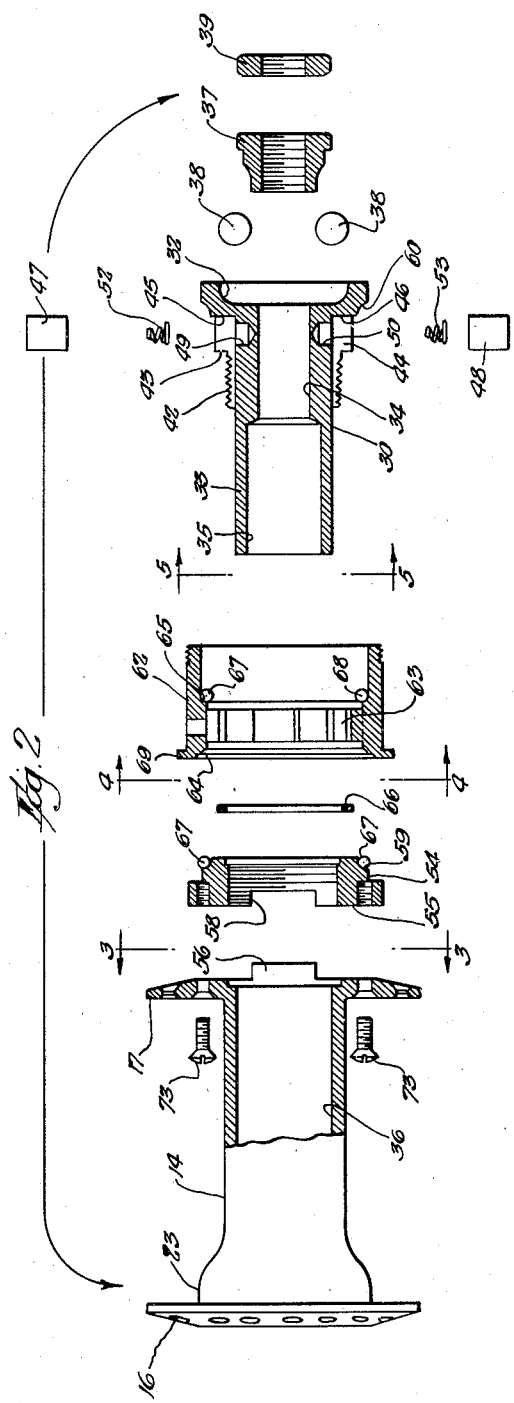
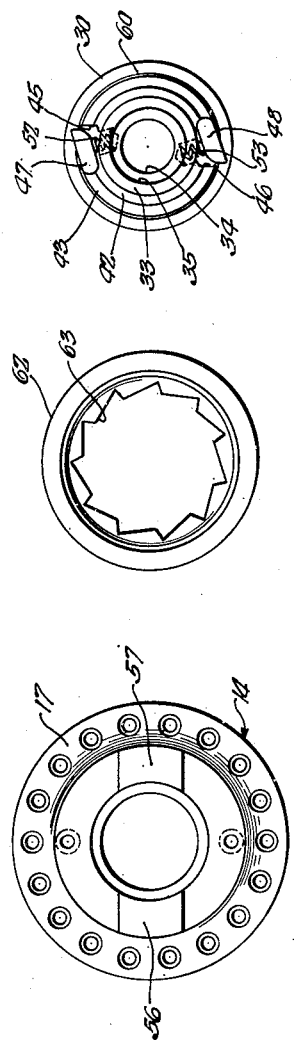
Inventor
Frank W. Schwinn
By Albert G. McCaleb
Atty.

Patented Nov. 29, 1949

2,489,934

UNITED STATES PATENT OFFICE 2,489,934

CYCLE FREEWHEELING DEVICE

Frank W. Schwinn, Chicago, Ill.

Application July 10, 1946, Serial No. 682,636

4 Claims. (Cl. 192—64)

This invention relates to freewheeling devices, and more particularly to those of the type adapted to use on bicycles and the like.

It is a general object of my present invention to provide a freewheeling device of the type referred to which is so constructed and arranged that the detrimental effects of variations of parts, within reasonable manufacturing tolerances, are minimized without complication of the parts or the assembly, whereupon efficient devices may be consistently produced in large quantities at a reasonable cost.

As another object, the invention comprehends the provision of a freewheeling device for cycles and the like in which outer shaft bearing races are spaced axially of the shaft at opposite ends of two telescopically-engaging tubular members, which tubular members are press fitted together, rather than being threaded together, so as to avoid the possibility of misalignment and eccentricity of the bearings resulting from the fit provided by usual production thread tolerances.

Another object of my invention is to provide a freewheeling device for cycles and the like which is easily assembled in production and may be easily disassembled and assembled after use for cleaning and adjustment.

This invention further has as one of its objects the provision of a light weight freewheeling device having relatively few parts, all of which parts may be readily machined with required accuracy for consistent quality in production quantities.

Other objects and advantages of the invention will be apparent from the following description and the accompanying drawings in which similar characters of reference indicate similar parts throughout the several views.

In the two sheets of drawings,

Fig. 1 is a plan view of an assembled freewheeling device embodying a preferred form of my present invention, wherein a longitudinal portion is cut away to show parts of the device in section and to illustrate parts of the internal assembly;

Fig. 2 is an exploded view depicting parts of the assembly shown in Fig. 1 with the parts spread out so as to indicate their relationships to the assembly; and Figs. 3, 4 and 5 are end views of the parts taken substantially as indicated by lines 3—3, 4—4, and 5—5 in Fig. 2, and viewed in the directions indicated by the arrows.

The exemplary embodiment of my freewheeling device, which is shown in the accompanying drawings for purposes of illustration, is adapted to use on bicycles and the like. Considered generally and summarily, my disclosed freewheeling device includes a main shaft 10 having its ends mounted in rear fork frame arms 12 and 13 of a bicycle and having rotatably mounted thereon a wheel hub shell 14, which shell has a driving mechanism 15 connected thereto at one end. As shown in Fig. 1, the wheel hub shell 14 has radially extending flanged ends 16 and 17, each of which has a plurality of circumferentially spaced apertures therein from which spokes 18 extend outwardly to and carry the rim of a wheel (not shown). The driving mechanism 15 includes elements providing a uni-directional driving connection between any one of a plurality of sprockets 19, 20 or 22 and the hub shell 14.

Considering the structure of my freewheeling device in greater detail, the hub shell 14 has at one end a portion 23 of enlarged diameter, within which is mounted a bearing race 24. An adjustable cone 25 threaded onto one end of the shaft 10 serves as an associated inner race for an anti-friction bearing including series of balls 26. A cap 27 fitted into the outer end of the enlarged end portion 23 of the hub shell and extending inwardly in a radial direction in close proximity with the cone 24 retains lubricant around the bearing and prevents dirt from getting into the bearing. Nuts 28 and 29 on the outer end of the shaft secure that end of the shaft to the rear fork arm 12.

At the end of the hub shell 14 opposite the enlarged portion 23, the driving mechanism 15 includes a combined bearing race and pawl support member 30 having at one end a bearing race 32 and at its other end a cylindrical portion 33. An axial bore 34 of somewhat larger diameter than the shaft 10 extends through the combined bearing race and pawl support member and is preferably counterbored, as indicated at 35, at the end opposite the bearing race 32.

The outer surface of the cylindrical portion 33 of the combined bearing race and pawl support member is axially aligned and concentric with respect to the bearing race 32. The part may be readily machined to effect this result. Furthermore, the diameter of the cylindrical portion 33 is such that it fits tightly into a cylindrical axial bore 36 in the hub shell 14. The cylindrical axial bore in the hub shell is machined for concentricity and axial alignment with respect to the inner surface of the enlarged end portion 23 which carries the bearing race 24. With the parts thus machined and the fit between the cylindrical bore 36 and the outer surface of the cylindrical portion 33 being tight, alignment and concentricity of the bearing races 24 and 32 are effected through the use of machining operations and tolerances well within the range of production operations. If the parts were threaded together, for example, the normal thread tolerances might well produce a source of difficulty or inaccuracy which would result in misalignment or eccentricity of the shaft bearings.

The shaft 10 extends through the bores in the hub shell 14 and the combined bearing race and pawl support member 30, and has a cone 37 threaded onto its end adjacent and opposed to the bearing race 32 so that a series of balls 38 disposed between the latter mentioned race and cone provide an anti-friction bearing for supporting the driving mechanism relative to the shaft. Adjacent the cone 37 are nuts 39 and 40 by which the shaft is secured in place relative to the rear fork frame arm 13.

On its outer surface adjacent the cylindrical end portion 33 and spaced from the bearing race 32, the combined bearing race and pawl support member 30 has a threaded portion 42 of larger diameter than the cylindrical end portion 33. At the end opposite the cylindrical portion 33 the threaded portion 42 terminates at a shoulder 43 which is provided by a portion 44 of increased diameter on the combined bearing race and pawl support member which is integral therewith and disposed between the threaded portion 42 and the bearing race 32. Circumferentially separated rectangular recesses 45 and 46 in the portion 44 of the combined bearing race and pawl support member 30 are, in the present instance, diametrically opposed and provide seats for movably supporting pawls 47 and 48, respectively. Radial bores 49 and 50 aligned with the recesses 45 and 46, respectively, serve as seats for coiled compression springs 52 and 53 which urge the pawls 47 and 48 outwardly in a direction radial to the combined bearing race and pawl support member.

A flanged collar 54 is threaded onto the threaded portion 42 of the combined bearing race and pawl support member 30 and has an inner end surface 55 which is adapted to engage the outer end surface of the radially extending flanged end of the hub shell 14 when the cylindrical end portion thereof is inserted into the cylindrical bore 36. By preference, and for the purpose of transmitting driving force from the driving mechanism to the hub shell, the hub shell is provided at its ends with diametrically displaced and axially projecting lugs 56 and 57 which fit into complementary slots 58 in the end of the flanged collar 54.

As shown in Figs. 1 and 2, the flanged collar 54 has at the end remote from the hub shell a bearing race 59 and the end portion of the combined bearing race and pawl support member has thereon a bearing race 60 of substantially the same size as the race 59. In the assembly, as shown in Fig. 1, the races 59 and 60 are axially displaced and are opposed in disposition to take thrust in axially opposite directions as well as to provide radial bearing surfaces.

A sleeve 62 has on its inner surface integrally formed ratchet teeth 63 and is adapted by axially displaced bearing races 64 and 65 on axially opposite sides of the ratchet teeth to be rotatably supported relative to the bearing races 59 and 60 by series of balls 67 and 68. Being thus supported, the sleeve 62 is located axially by the opposed bearing races 59 and 64 on the one end and 60 and 65 on the other. In this position, the ratchet teeth 63 are aligned radially with the pawls 47 and 48 so that the normal engagement of the pawls with the ratchet teeth provides a driving connection between the sleeve and the combined bearing race and pawl support member which is effective in one direction for turning the wheel and permits relatively free rotation of the sleeve relative to the hub shell in the other direction.

The outer surface of the sleeve 62 is desirably polygonal and carries thereon one or more sprockets, such as 19, 20 and 22, having therein openings which conform to the polygonal surface of the sleeve. The sprockets are axially retained on the sleeve by a radially extending flange 69 at one end of the sleeve and a nut 70 which is threaded onto the outer end of the sleeve.

A cap 72 fits into the outer end of the sleeve 62 and extends inwardly in a radial direction to close proximity with the outer surface of the cone 37 to provide a cover for the bearing which includes the race 32 and the balls 38.

In the assembly of the driving mechanism 15, the springs 52, pawls 47 and 48, and sleeve 62 are placed in their assembled relationship on the combined bearing race and pawl support member before the flanged collar 54 is screwed into position thereon. The collar thus holds the parts of the driving mechanism in their assembled relationship. Preferably, a shim washer 66 is disposed between the end of the flanged collar 54 and the shoulder 43 to provide a variable element for adjusting the opposed bearings which comprise the balls 67 and 68. After such assembly, the cylindrical portion 33 is pressed into the cylindrical bore 36 to an extent such that the lugs 56 engage their respective slots 58 and the end of the collar 54 abuts the end surface of the hub shell. The parts are then removably retained in their assembled relationship by fastening means, such as screws 73, which extend axially through the flanged end 17 of the hub shell and are threaded into the flanged collar 54.

From the foregoing description taken in relation to the accompanying drawings, it may be readily understood that my free-wheeling device provides a structure in which the alignment and concentricity of the parts are insured in the original assembly and which may be easily disassembled and assembled for cleaning and adjustment after use with the parts re-assembling each time in their concentric and aligned positions. Furthermore, the disclosed embodiment of my invention incorporates parts which may be readily machined in production quantities and with desired accuracy at a reasonable cost. The structure of my freewheeling device additionally provides a durable, light weight assembly incorporating relatively few parts.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a freewheeling device for cycles and the like, the combination comprising a hub shell having outwardly extending flange portions at its ends, a cylindrical inner bore, an enlarged portion at one end, and a plurality of bores parallel to the axis of the cylindrical bore in the flange portion at the end opposite said enlarged portion; a combined bearing race and pawl support member having a cylindrical portion at one end which fits snugly into said cylindrical bore at the end of the hub shell opposite said enlarged portion, said combined bearing race and pawl support member also having an axial bore therethrough, a bearing race at the end thereof opposite said cylindrical portion, a plurality of radial bores and aligned pawl seats therein adjacent the bearing race, and a threaded portion intermediate said radial bores and said cylindrical portion; a helical compression spring in each of said radial bores and a pawl in each of said pawl seats urged outwardly by one of the springs; a flanged collar threaded onto said threaded portion and having threaded bores aligned with said plurality of bores in the hub shell flange; screws extending through said plurality of bores in the flange portion of the hub shell and threaded into said plurality of bores in said flanged collar to hold said hub shell, combined bearing race and pawl support member and said flanged collar in assembled relationship; said flanged collar and said combined bearing race and pawl support member providing axially separated ball races on opposite sides of said pawl seats; a sleeve having internal ratchet teeth aligned with said pawls and bearing races opposed to the last mentioned ball races; bearing balls disposed in the opposed races for supporting and axially retaining said sleeve; sprocket means drivingly connected to the outer surface of the collar; a shaft extending axially through the cylindrical bores in said hub shell and combined bearing race and pawl support member; and bearing means at opposite ends of the shaft coacting with said enlarged portion of the hub shell and the bearing race at the end of said combined bearing race and pawl support member.

2. In a freewheeling device for cycles and the like, the combination with a wheel supporting hub shell having bearing means at one end and a cylindrical bore at the other end axially aligned and concentric with the bearing means, of a separable subassembly comprising a combined bearing race and support member having a cylindrical portion at one end, a ball race at the other end concentric to and axially aligned with said cylindrical portion, and a threaded exterior portion intermediate said ends; a flanged collar threaded onto said threaded portion of the combined bearing race and support member; a sleeve encircling end portions of said flanged collar and said combined bearing race and support member; bearing means rotatably supporting and axially locating said sleeve relative to said flanged collar and said combined bearing race and support member; unidirectional drive means interposed between and providing a driving connection between said sleeve and said combined bearing race and support member; sprocket means drivingly connected to said sleeve; said cylindrical portion of the combined bearing race and support member being of a size to fit tightly into said cylindrical bore of the hub shell so that said bearing means and said ball race are axially aligned and concentric, and removable fastening means for securing said flanged collar to the hub shell to hold the hub shell and said subassembly together.

3. In a freewheeling device for cycles and the like, the combination with a wheel supporting hub shell having bearing means at one end and a cylindrical bore at the other end axially aligned and concentric with the bearing means, of a separable subassembly comprising a combined bearing race and support member having a cylindrical portion at one end, a ball race at the other end concentric to and axially aligned with said cylindrical portion, and a threaded exterior portion intermediate said ends; a flanged collar threaded onto said threaded portion of the combined bearing race and support member; a driving mechanism including uni-directional drive means mounted on and carried by said flanged collar and said combined bearing race and support member; said cylindrical portion of the combined bearing race and support member being of a diameter and length to fit tightly into said cylindrical bore of the hub shell for effecting and maintaining axial alignment and concentricity of said bearing means and said ball race; and removable fastening means for securing said flanged collar to the hub shell to hold the hub shell and said subassembly together.

4. In a freewheeling device for cycles and the like, the combination with a wheel supporting hub shell having bearing means at one end and a cylindrical bore at the other end axially aligned and concentric with the bearing means, of a separable subassembly comprising a combined bearing race and support member having a cylindrical portion at one end, a ball race at the other end concentric to and axially aligned with said cylindrical portion, and a threaded exterior portion intermediate said ends; a flanged collar threaded onto said threaded portion of the combined bearing race and support member; said cylindrical portion of the combined bearing race and support member being of a diameter and length to fit tightly into said cylindrical bore of the hub shell for effecting and maintaining axial alignment and concentricity of said bearing means and said ball race; and removable fastening means for securing said flanged collar to the hub shell to hold the hub shell and said subassembly together.

FRANK W. SCHWINN.

REFERENCES CITED

The following references are of record in the file of this patent:

UNITED STATES PATENTS

| Number | Name | Date |
| --- | --- | --- |
| 2,394,112 | Schwinn | Feb. 5, 1946 |

FOREIGN PATENTS

| Number | Country | Date |
| --- | --- | --- |
| 1,755 | Great Britain | A. D. 1899 |